Dec. 31, 1968

R. D. ALLEN 3,419,149

SEWAGE REMOVAL PLANT

Filed Feb. 3, 1966

INVENTOR.
ROBERT D. ALLEN
BY
Charles L. Lauenbach
atty

United States Patent Office 3,419,149
Patented Dec. 31, 1968

3,419,149
SEWAGE REMOVAL PLANT
Robert D. Allen, 379 Niles-Cortland Road SE.,
Warren, Ohio 44484
Filed Feb. 3, 1966, Ser. No. 524,702
4 Claims. (Cl. 210—262)

This invention relates to waste disposal systems and, more particularly, to a compact, self-contained, waste disposal system which is suitable for use on board a ship as a sewage removal plant, and which may be used in salt, brackish, or fresh water, and may be used without need for addition of chemicals, activated sludge, or special primary materials. It may be installed in a minimum of time and may be put into operation immediately after installation. It is designed to remove all waste matter, whether organic, inorganic, or micro-organism. It is designed to first remove gross solids greater than a predetermined minimum size and then to incinerate the gross solids after having removed them from the liquid. The plant is made up of two units: (1) the strainer-filter unit; and (2) the incinerator.

It is, accordingly, an object of the invention to provide an improved self-contained sewage removal plant.

Another object of the invention is to provide an improved waste disposal plant.

A further object of the invention is to provide a waste disposal plant which will operate without the addition of chemicals, activated sludge, or any special primary materials.

Another object of the invention is to provide a sewage removal plant, which may be put into service immediately after installation.

Another object of the invention is to provide an improved waste removal plant, which will remove all waste materials from a liquid, whether organic, inorganic, or micro-organism larger than one micron in maximum dimension.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
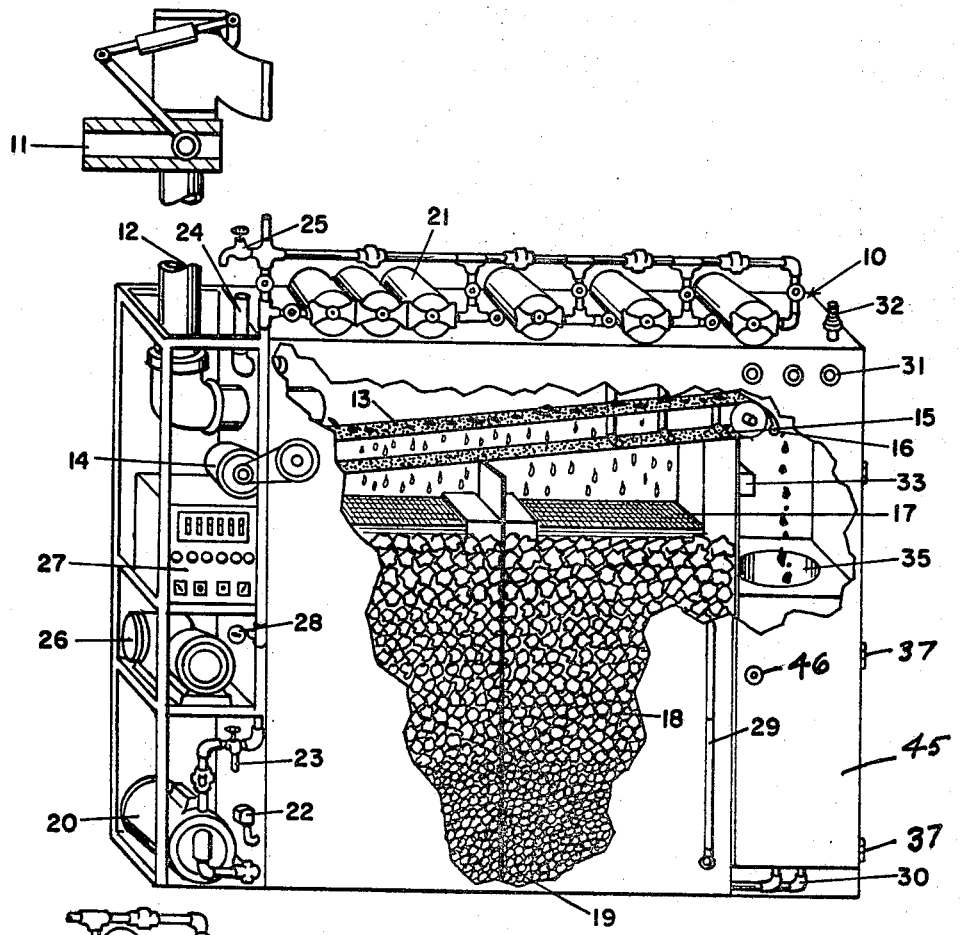
FIG. 1 is an isometric view partly broken away to show the device according to the invention.
Figure 2:
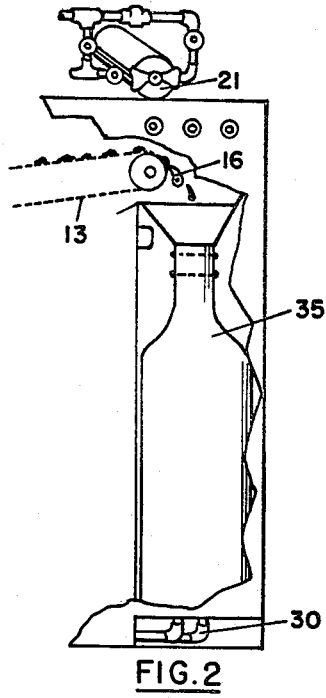
FIG. 2 is an enlarged view of a part of the device shown in FIG. 1.

Now with more particular reference to the strainer-filter unit shown in FIG. 1, the unit is shown having a tank closed at the top and having a bottom and four sides as shown. A rack is shown for supporting the various control units at the left side of the unit, and the filter cartridges 21 are shown at the top.

Sewage is fed into the unit through the quick-acting air cylinder operated gate valve 11 through the pipe 12 and discharged onto the mesh belt 13. The mesh belt may be a suitable wire belt made of, for example, a low grade of stainless steel to withstand corrosion and having meshes of a size suitable to remove particles of gross solids from the liquid sewage entering the inlet pipe 12. The belt 13 is supported on the spaced pulleys shown, which are supported on the tank in spaced parallel relation and driven by the belt drive 14. The gross solids may be cleaned from the belt to prevent its meshes from clogging by means of the air tube cushions 15, which may be designed to provide a suitable air stream to clean the belt. A rubber waste scraper 16 is supported at the end of the belt on the tank and it has a blade which scrapes the belt as it rotates and thus directs the gross solids from the end of the belt remote from the inlet pipe 12 into the plastic bags which will be held with their mouths open inside the enclosure behind the door 45. The door 45 may be held closed by means of a lock 46 and be supported on hinges 37.

The coke filter is supported in the tank below the wire mesh coke hold screen 17. The coke indicated at 18 will be provided in three sizes as indicated on the drawing. The top layer will be large sizes of two to three inches in largest dimensions. The center layer will be a layer of intermediate size, and the bottom layer may be relatively fine coke.

A filter drain pipe 19 is provided at the bottom of the tank, and liquid having entrained solids therein that have not been removed or otherwise treated by the coke beds will be removed from the bottom of the tank by means of the pump 20, which may be, for example, a one-half horsepower, forty p.s.i., twelve gallon per minute capacity pump.

Pump 20 will pump the liquid and entrained solids remaining after falling through the coke bed through the pipe indicated to the polishing cartridge filters 21. The polishing cartridge filters 21 will be connected in series and may have valves disposed at the points between the filters indicated. The finer filters will be disposed on the downstream end of the series. The fine filters may be by-passed; that is, if the smaller particles of entrained material are not objectionable in the outlet water, the finer filters may be cut out of the circuit. It is contemplated that the finest filter on the downstream end of the series will be of a size to remove particles of one micron in size. Thus, the resulting water would not be objectionable for discharge into any ordinary water course. The water from the polishing filters will be discharged through the outlet indicated at 25.

The flow switch 22 is provided to control the motor of pump 20 so that it will operate only when the tank has liquid in it. A sample valve 23 is provided to enable the operator to sample the liquid from the tank, and gases which could otherwise accumulate in the tank are vented from the tank by means of the vent 24. The clean water flowing from the filters may be sampled by means of valve 25 for test purposes.

An air blower 26 is connected to the system and is controlled by control panel 27. The motor and pump 20 are likewise controlled by suitable switch gear on the control panel 27, which is shown having starting switches for the conveyor motor drive 14, as well as the pump 20 and air blower 26. Pressure of the outlet from the pump is indicated on the gauge 28, and a liquid level sight gauge 29 is provided of a conventional type to indicate the level of the sewage in the tank. The control valves 31 are indicated, which may control the air and water to the system, and a water connection 32 is provided which may be used to connect water to the system for backwashing the coke bed. The valves 31 may also control the air to the air tube cushion belt cleaners 15.

Figure 3:
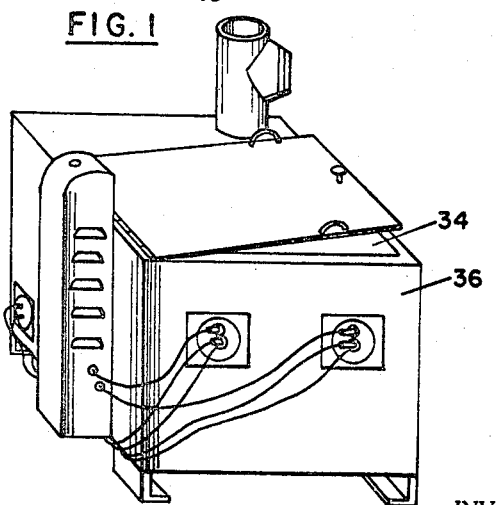
FIG. 3 is an isometric view of the incinerator unit for use with the device shown in FIG. 1.

Plastic bags may be supported under the discharge end of the belt for receiving gross solids from the end of the belt. These gross solids will be removed periodically and inserted into the incinerator unit indicated in FIG. 3, which may be of an ordinary type of incinerator having a bottom, sides, and a hinged top, as shown. The incinerator will be fired preferably by an oil fired burner, which will burn the plastic bags as well as the gross solids.

The foregoing specification sets forth the invention in its preferred practical forms but the structure shown is capable of modification within a range of equivalents without departing from the invention which is to be The embodiments of the invention in which an exclusive property or privilege is claimed are defined as follows:

1. A waste treatment system comprising,
a screen member supported in inclined relation,
a filter having coke disposed therein below said screen,
a plurality of polishing cartridges connected in series,
inlet means to admit liquid waste containing gross solids and entrained solids to said screen whereby said gross solids are screened from said waste and said liquid and entrained solids pass to said coke filter,
means to conduct said liquid from said coke filter to said polishing cartridge filters,
and means to remove said gross solids from said screen, said screen comprises a mesh belt, spaced pulleys are provided supporting said belt, and drive means connected to one of said pulleys to drive said belt, said drive means and pulleys comprising said means to remove said gross solids from said belt.

2. The waste treatment system recited in claim 1 wherein
said means to remove said solids from said screen comprises air tubes for blowing air onto said belt whereby said solids are removed therefrom.

3. The waste treatment system recited in claim 1 wherein
said filters vary in filter size,
some said filters removing substantially all waste from said liquid above one micron in size.

4. The waste treatment system recited in claim 3 wherein
means is provided on said system to package said gross solids and said belt discharges said gross solids into said means.

References Cited

UNITED STATES PATENTS

| | | | |
|---|---|---|---|
| 1,329,727 | 2/1920 | Smith | 210—152 X |
| 1,886,267 | 11/1932 | Gleason et al. | 210—27 |
| 3,118,833 | 1/1964 | Reinhardt | 210—151 |
| 3,218,253 | 11/1965 | Clarke et al. | 210—27 |

SAMIH N. ZAHARNA, *Primary Examiner.*

U.S. Cl. X.R.

210—266, 297